(12) United States Patent
Ng et al.

(10) Patent No.: US 10,618,577 B2
(45) Date of Patent: Apr. 14, 2020

(54) WORKING MACHINE WITH CRAWLER

(71) Applicant: SUMITOMO HEAVY INDUSTRIES CONSTRUCTION CRANES CO., LTD., Tokyo (JP)

(72) Inventors: Jacinda Ng, Aichi (JP); Kakuichi Furukawa, Aichi (JP); Shingo Tanimoto, Aichi (JP)

(73) Assignee: SUMITOMO HEAVY INDUSTRIES CONSTRUCTION CRANES CO., LTD., Tokyo (JP)

(*) Notice: Subject to any disclaimer, the term of this patent is extended or adjusted under 35 U.S.C. 154(b) by 0 days.

(21) Appl. No.: 16/538,314

(22) Filed: Aug. 12, 2019

(65) Prior Publication Data

US 2019/0359267 A1    Nov. 28, 2019

Related U.S. Application Data

(63) Continuation of application No. PCT/JP2018/004495, filed on Feb. 8, 2018.

(30) Foreign Application Priority Data

Feb. 16, 2017  (JP) .................... 2017-027120

(51) Int. Cl.
    *B62D 55/084*   (2006.01)
    *B62D 55/06*    (2006.01)
    *B66C 9/00*     (2006.01)

(52) U.S. Cl.
    CPC .......... *B62D 55/084* (2013.01); *B62D 55/06* (2013.01); *B66C 9/00* (2013.01); *B66C 2700/0378* (2013.01)

(58) Field of Classification Search
    CPC .................................................. B62D 55/084
    See application file for complete search history.

(56) References Cited

U.S. PATENT DOCUMENTS 3,894,598 A  *  7/1975  Yeou ................... B62D 55/084
                                                180/9.48
5,293,949 A  *  3/1994  Zimmermann ......... E02F 9/024
                                                180/9.48

(Continued)

FOREIGN PATENT DOCUMENTS

| JP | H05-213236 A | 8/1993 |
| JP | 2012-148626 A | 8/2012 |
| JP | 2014-129079 A | 7/2014 |

OTHER PUBLICATIONS

International Search Report issued in Application No. PCT/JP2018/004495, dated May 1, 2018.

*Primary Examiner* — Joseph M Rocca
*Assistant Examiner* — Harold Eric Pahlck, III
(74) *Attorney, Agent, or Firm* — Michael Best & Friedrich LLP

(57) ABSTRACT

A working machine with a crawler includes a lower traveling body having a pair of crawlers, an upper turning body, an extension beam installed rotatably to be parallel in a longitudinal direction of the crawler, a fitting portion opened in a side frame of the crawler, a fixing pin fixing the extension beam to the side frame, a fixing pin insertion hole, a fixing pin fitting hole, and a reinforcement rib, in which the extension beam extends to be inserted into the fitting portion, and the reinforcement rib is provided at a center portion of an opening of the fitting portion, and the fixing pin fitting hole is disposed at a position which is deviated from an imaginary center line extending along a longitudinal direction of the fitting portion from the center portion and does not interfere with the reinforcement rib.

4 Claims, 18 Drawing Sheets

(56) References Cited

U.S. PATENT DOCUMENTS

| | | | | |
|---|---|---|---|---|
| 6,145,610 A | * | 11/2000 | Gallignani | B62D 55/084 |
| | | | | 180/9.48 |
| 9,132,870 B2 | * | 9/2015 | Smith | B62D 55/084 |
| 9,604,680 B2 | * | 3/2017 | Tochigi | B62D 21/186 |
| 2015/0096955 A1 | | 4/2015 | Risen | |

* cited by examiner

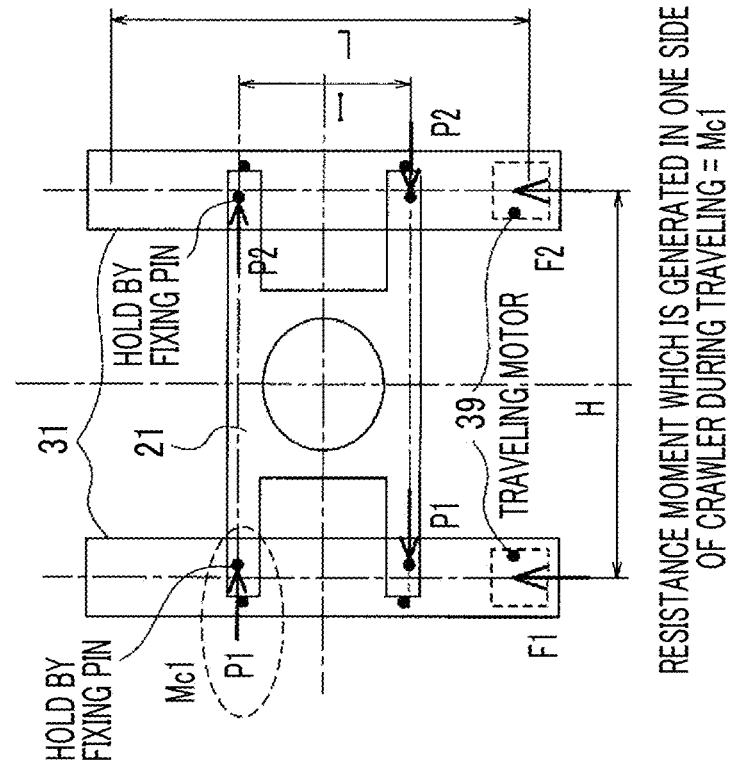

FIG. 21B

RESISTANCE MOMENT WHICH IS GENERATED IN ONE SIDE OF CRAWLER DURING TRAVELING = Mc1

FORCE P IN MACHINE LATERAL DIRECTION ACTING ON FIXING PIN BY RESISTANCE MOMENT $Mc1 = \frac{Mc1}{I}$ $$Mc1 = P1 \times \frac{I}{2} + P1 \times \frac{I}{2}$$
$$= P1 \times I$$
$$P1 = \frac{Mc1}{I}$$

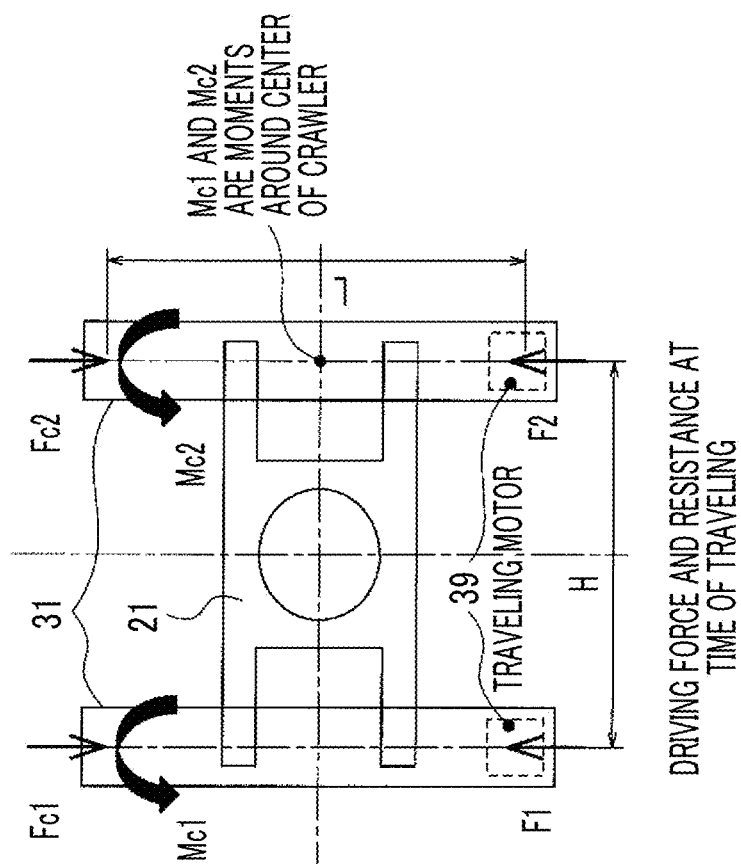

FIG. 21A

DRIVING FORCE AND RESISTANCE AT TIME OF TRAVELING

TRAVELING DRIVING FORCE F1, F2  RESISTANCE Fc1, Fc2

RESISTANCE MOMENT Mc1 = Mc2

L1 = HORIZONTAL DISTANCE OF CENTER OF RIGHT AND LEFT CRAWLER (GAUGE WIDTH)
L2 = DISTANCE FROM FALL FULCRUM R2 TO POSITION OF LOAD M
G = DISTANCE FROM FALL FULCRUM TO POSITION OF CENTER GRAVITY W $$\text{STABILITY} = \frac{\text{STABILITY MOMENT}}{\text{OVERTURNING MOMENT}} * 100$$

$$= \frac{W * G}{L2 * M} * 100$$

* WIDEN LOWER GAUGE WIDTH AND TAKE FALL FULCRUM OUT

WORKING MACHINE WITH CRAWLER

RELATED APPLICATIONS

The contents of Japanese Patent Application No. 2017-027120, and of International Patent Application No. PCT/JP2018/004495, on the basis of each of which priority benefits are claimed in an accompanying application data sheet, are in their entirety incorporated herein by reference.

BACKGROUND

Technical Field

Certain embodiment of the present invention relates to a working machine with a crawler.

Description of Related Art

A working machine with a crawler capable of increasing or reducing a distance between a pair of right and left endless track type traveling devices is known. For example, in the related art, in a working machine with a crawler capable of changing the distance between the traveling devices, an extendable and foldable extension beam is provided on a distal end of an axle extending in a right-left direction from the car body.

In the related art, a working machine with a crawler is known, which includes a car body, an axle which extends in a width direction from the car body, an extension beam which is turnably supported at a distal end of the axle and can rotate between two positions such as an extended position and a folded position with respect to the axle, a pair of right and left endless track type traveling devices which has a side frame, an endless track, and a traveling drive device, and is connected to a distal end of the axle or an extension beam distal end located at the extended position, an extendable device which moves the traveling device in an extension direction of the axle, and an extension beam fixing member which fixes the extension beam at the extended position between the extension beam and the axle.

In addition, the extension beam supports a crawler and a crawler side frame, and thus, a large load is applied to the extension beam due to a machine body and a suspension load. Accordingly, the large load is also applied to a fitting portion which is provided as a window-shaped opening in the crawler side frame. Therefore, for example, a reinforcement rib serving as a reinforcement is provided below of a bottom plate of the fitting portion.

SUMMARY

According to an embodiment of the present invention, there is provided a working machine with a crawler, including: a lower traveling body which includes a pair of crawlers and a car body; an upper turning body which is turnably supported by the car body; an extension beam which is installed rotatably on a distal end side of an axle of the car body to be parallel in a longitudinal direction of the crawler; a fitting portion which is open in a side frame of the crawler; a fixing pin which fixes the extension beam inserted into the fitting portion to the side frame; a fixing pin insertion hole which is perforated in the extension beam and into which the fixing pin is inserted; a fixing pin fitting hole which is perforated in the fitting portion and into which the fixing pin is inserted; and a reinforcement rib which extends in a direction perpendicular to a side surface of the side frame on a lower surface of a bottom plate of the fitting portion, in which the extension beam extends such that the extension beam is inserted into the fitting portion, the fixing pin is inserted into the fixing pin fitting hole via the fixing pin insertion hole, and thus, the extension beam is fixed to the fitting portion, the reinforcement rib is provided at a center portion of an opening of the fitting portion, and the fixing pin fitting hole is disposed at a position which is deviated from an imaginary center line extending along a longitudinal direction of the fitting portion from the center portion and does not interfere with the reinforcement rib.

BRIEF DESCRIPTION OF THE DRAWINGS

FIGS. 21A and 21B is explanatory views showing a relationship of a force applied to the crawler crane, FIG. 21A shows a state of a force applied to the lower traveling body of the crawler crane, and FIG. 21B shows a state of a force in a machine lateral direction in the present embodiment where a position of the fixing pin insertion hole is offset by a distance γ from a center line.

DETAILED DESCRIPTION

In order to effectively reinforce a fitting portion, it is desirable to provide a reinforcement rib at a bottom plate portion of the fitting portion located immediately below an extension beam. However, a through-hole of a fixing pin is located on a longitudinal center line of the extension beam, and thus, the reinforcement rib cannot be provided along the center line. Therefore, the reinforcement rib is installed at a position which avoids the center line along which a stopper pin and the fixing pin are mounted.

However, if the reinforcement rib is installed at the position which avoids the center line, a load received at a bottom plate portion of the fitting portion is uneven when the reinforcement rib receives a load, and there is a problem that a desired strength reinforcement effect cannot be obtained.

Moreover, a load by a machine body and a suspension load is transmitted to a shoe and the ground via a plurality of lower rollers disposed on a lower surface of a crawler side frame. In this case, if an uneven distribution of a load that the lower roller bears increases, it is necessary to increase strength of the lower roller and/or to increase the number of lower rollers, which generates an increase in a cost.

It is desirable to install the reinforcement rib along a center of a longitudinal lower portion of the fitting portion and suppress an uneven distribution of a load of the lower roller.

According to an embodiment of the present invention, it is possible to install the reinforcement rib along a center of a longitudinal lower portion of the fitting portion and suppress an uneven distribution of a load of a lower roller.

Figure 1:
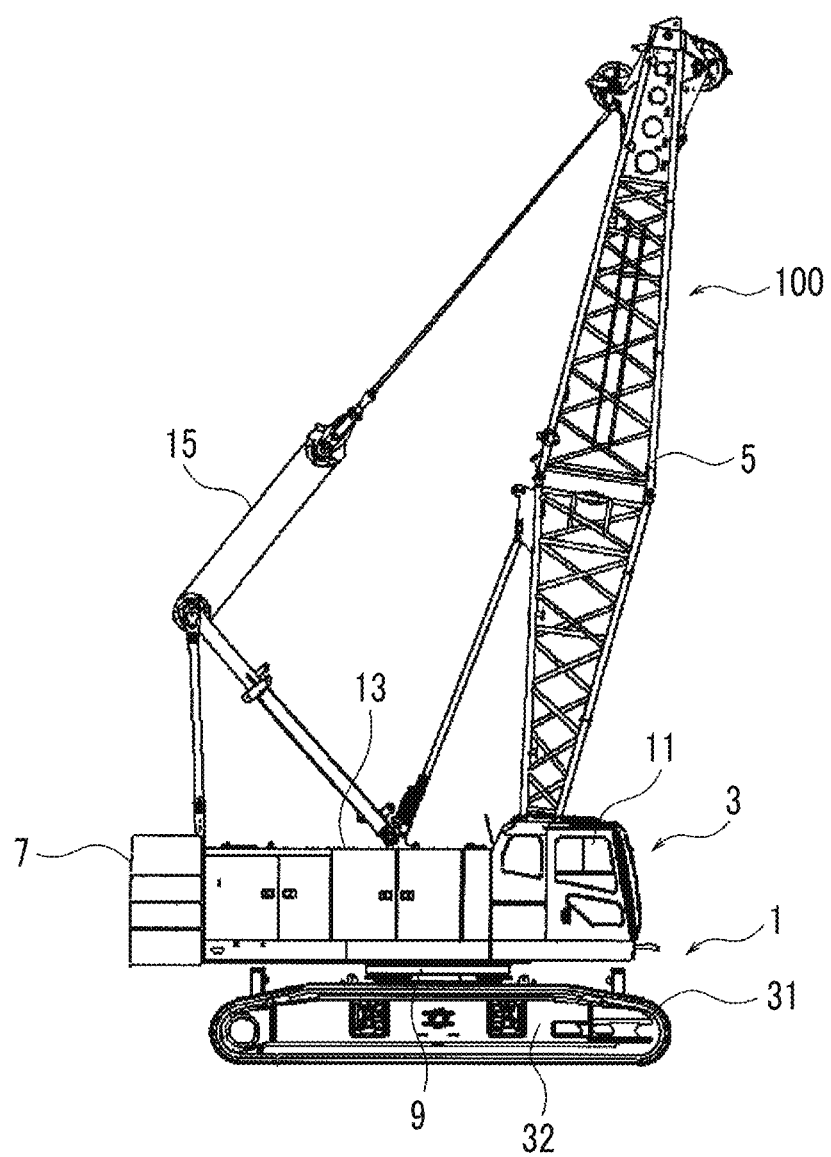
FIG. 1 is a side view showing an entire configuration of a crawler crane as a working machine with a crawler according to an embodiment of the present invention.

Hereinafter, an embodiment of the present invention will be described with reference to the drawings. FIG. 1 is a side view showing an entire configuration of a crawler crane as a working machine with a crawler according to the embodiment of the present invention. A crawler crane 100 basically includes a lower traveling body 1, an upper turning body 3, a boom 5, and a counterweight 7. The upper turning body 3 is turnably provided on the lower traveling body 1 via a turning wheel 9. The boom 5 is pivotally supported by the upper turning body 3 in an undulating manner. A cab (driver's cab) 11 is installed on an end portion of the upper turning body 3 on a side opposite to a side on which the counterweight 7 is installed, and a house (machine room) 13 is provided between the cab 11 and the counterweight 7.

A hoisting drum which is a winch drum for winding up and an undulating drum which is a winch drum for undulation are mounted on the upper turning body 3. A hoisting rope is wound around the hoisting drum, the hoisting rope is wound or unwound by driving of the hoisting drum, and a hook suspended at a distal end of the boom 5 is moved up or down. An undulating rope 15 is wound around the undulating drum, and the undulating rope 15 is wound or unwound onto the undulating drum by driving of the undulating drum. Accordingly, the boom 5 is undulated.

A hoisting hydraulic motor and a hoisting hydraulic motor are installed in the house 13. The hoisting drum is driven by a hoisting hydraulic motor, and the undulating drum is driven by the undulating hydraulic motor. In addition, a braking device which brakes each of the hoisting hydraulic motor and the undulating hydraulic motor is installed, and thus, the driving and braking of each of the hoisting hydraulic motor and the undulating hydraulic motor are controlled.

Figure 2:
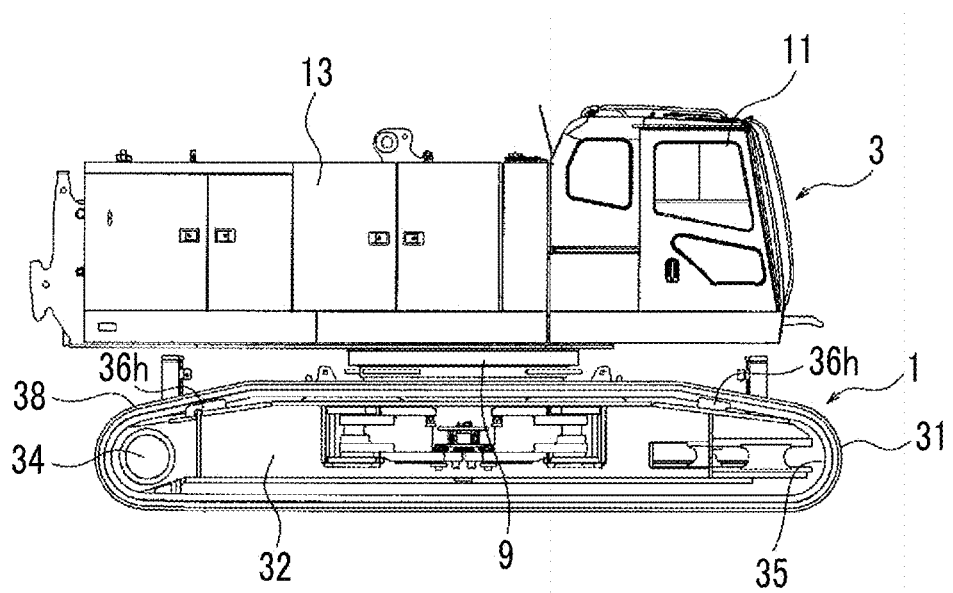
FIG. 2 is a side view showing a lower traveling body and an upper turning body portion of the crawler crane of FIG. 1.
Figure 3:
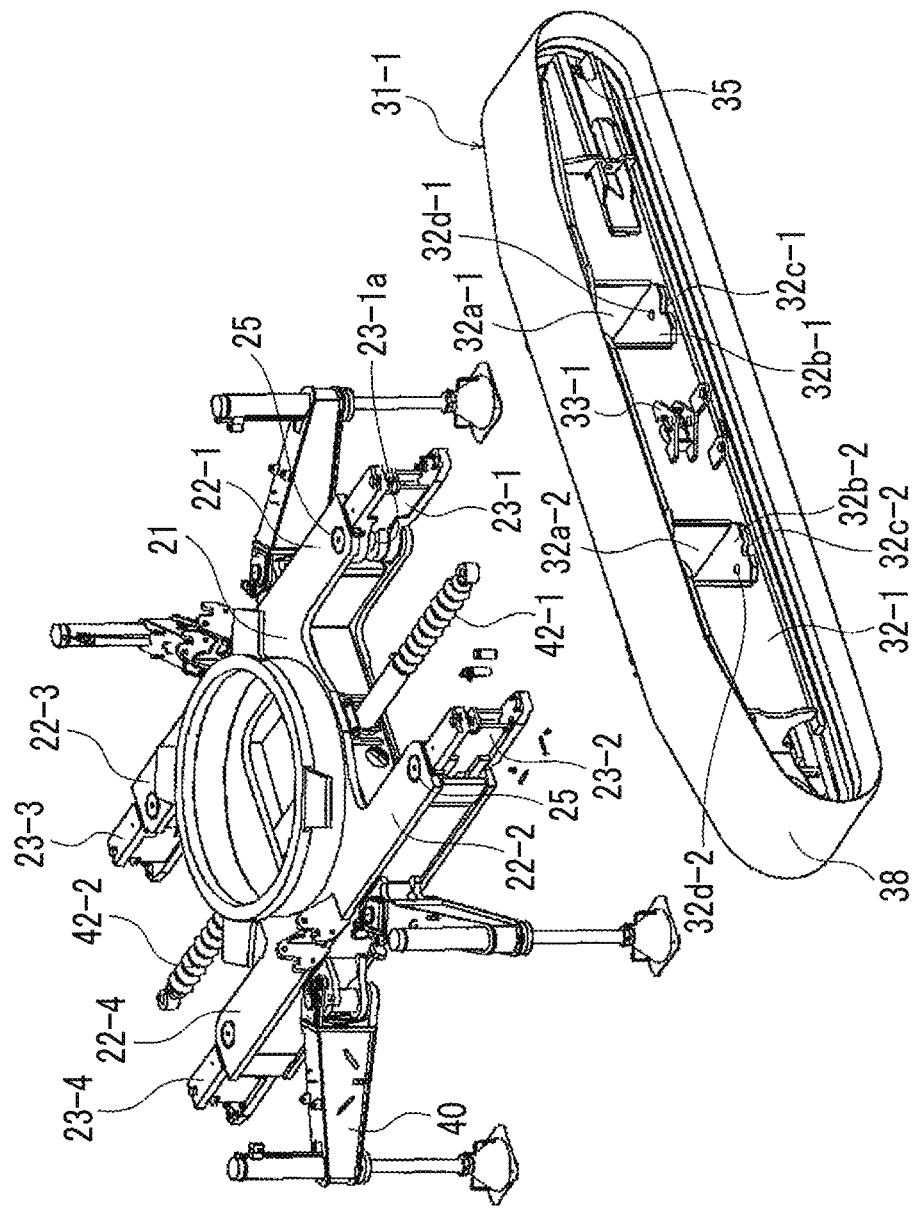
FIG. 3 is a perspective view showing a state when the lower traveling body of the crawler crane of FIG. 1 is separated into a car body and a crawler.
Figure 4:
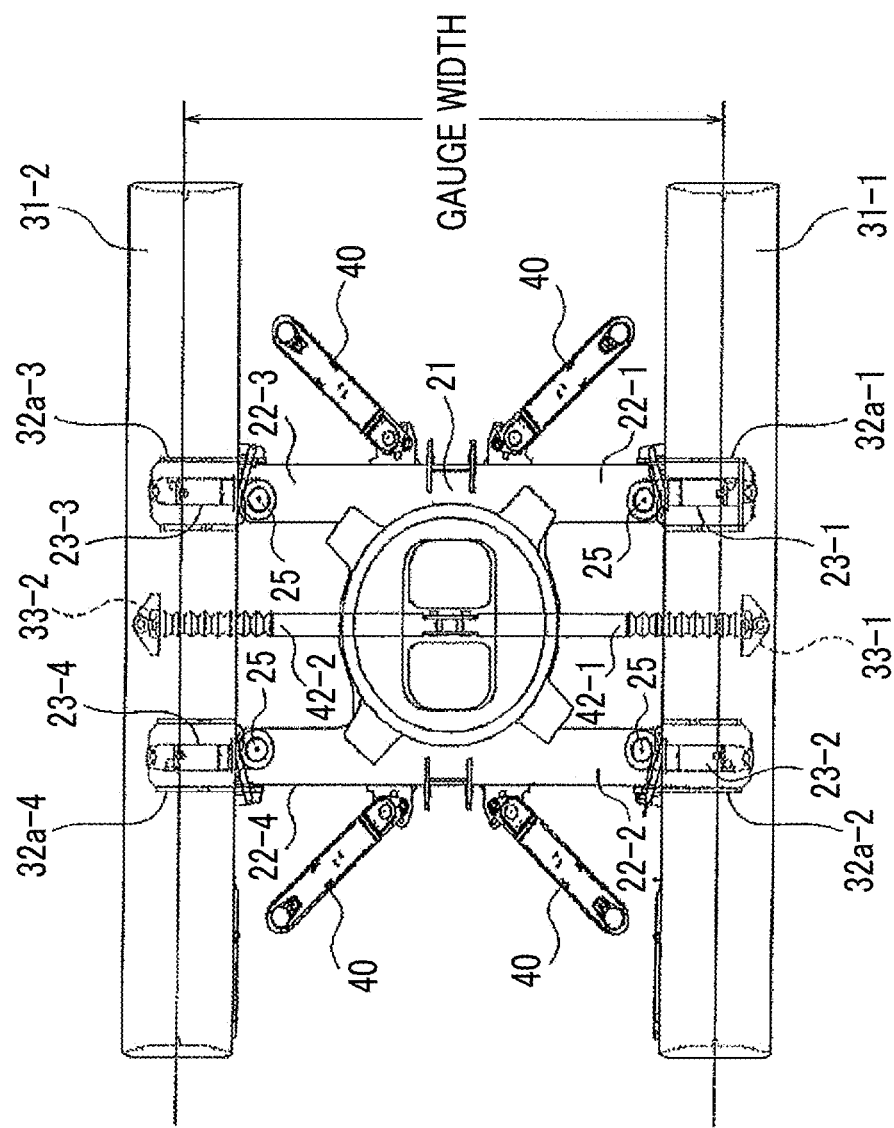
FIG. 4 is a plan view showing a state when the crawler of FIG. 3 is mounted on the car body.

FIG. 2 is a side view showing the lower traveling body 1 and a portion of the upper turning body 3 of the crawler crane 100, FIG. 3 is a perspective view showing a state when the lower traveling body 1 is separated into a car body and a crawler, and FIG. 4 is a plan view showing a state when the crawler is mounted on the car body. In FIGS. 2 to 4, the lower traveling body 1 includes a car body 21 and a pair of crawlers 31-1 and 31-2. A total of four axles 22-1, 22-2, 22-3, and 22-4 extending in a right-left direction are provided on front and rear portions of the car body 21. Extension beams 23-1, 23-2, 23-3 and 23-4 are pivotally supported oscillatingly by connection pins 25 at distal ends of the respective axles 22-1, 22-2, 22-3, and 22-4. In the following descriptions, in a case where each portion is generally indicated, a symbol following a hyphen or a subscript indicated by an alphabet is omitted.

A pair of jack-up devices 40 for jacking up the lower traveling body 1 is provided in each of the front portion and the rear portion of the car body 21. A pair of right and left retraction cylinders 42-1 and 42-2 each serving as a crawler extendable device for increasing or reducing a distance between the pair of crawlers 31-1 and 31-2 and the car body 21 is provided on side surfaces of the car body 21.

Each of the crawlers (traveling devices) 31-1 and 31-2 is a so-called endless track type crawler and the crawlers 31-1 and 31-2 are respectively attached to the right front and right rear axles 22-1 and 22-2 and the left front and left rear axles 22-3 and 22-4. In the drawings, the right crawler 31-1 includes a crawler side frame (hereinafter, referred to as a side frame) 32-1, a driving wheel 34 and a driven wheel 35 of the traveling drive device, an upper roller (or slider) 36h, a lower roller 36 (FIG. 13), and an endless track (crawler belt) 38 which is wound between the driving wheel 34 and the driven wheel 35. The traveling drive device includes the driving wheel (sprocket) 34 which is rotatably supported in the vicinity of a rear end of each side frame 32-1, and a traveling hydraulic motor which drives the driving wheel 34. In addition, shapes of the driving wheel 34 and the driven wheel 35 are omitted in the drawings, and attachment positions thereof are shown.

Figure 5A:
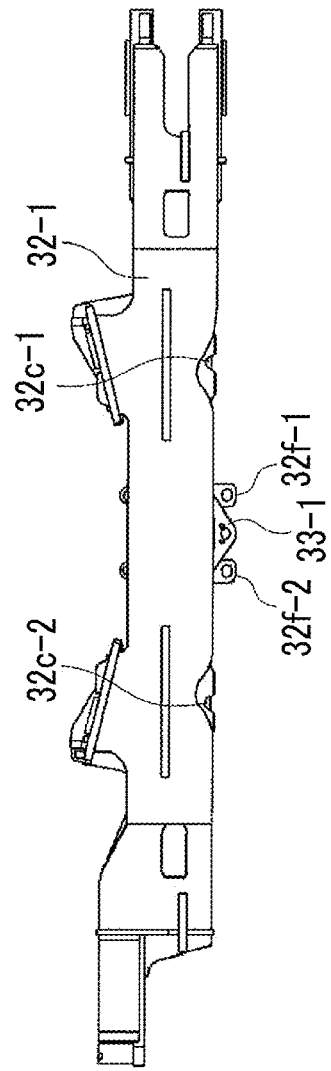
FIG. 5A is a plan view showing a right side frame in FIG. 4.
Figure 5B:
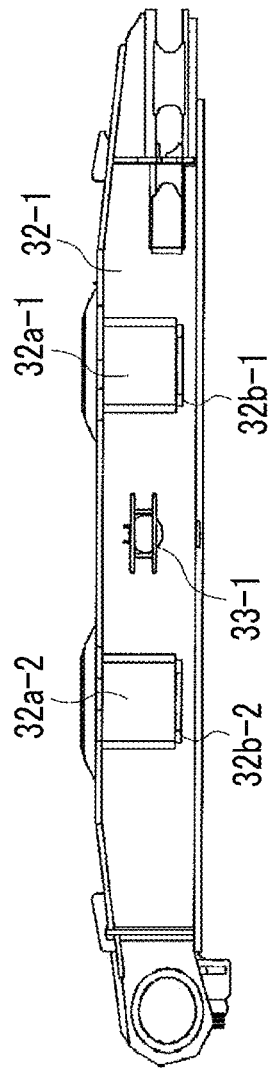
FIG. 5B is a front view showing the right side frame.
Figure 5C:
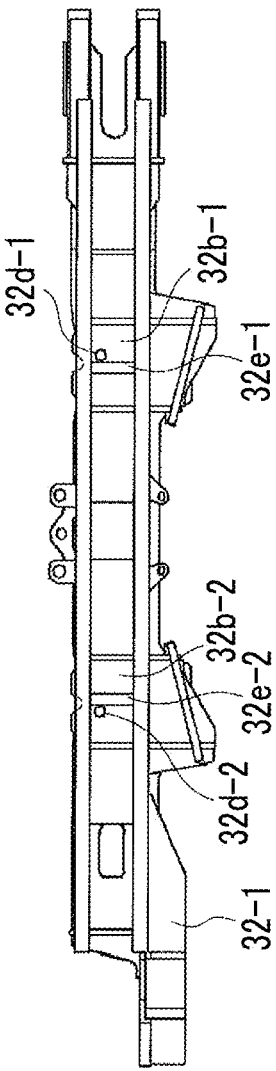
FIG. 5C is a bottom view showing the right side frame.

FIG. 5A is a plan view showing the right side frame 32-1, FIG. 5B is a front view showing the right side frame 32-1, and FIG. 5C is a bottom view showing the right side frame 32-1. In FIGS. 5A to 5C, fitting portions 32a-1 and 32a-2 for inserting the axles 22-1 and 22-2 are provided at two front and rear locations in the right side frame 32-1. Each of the fitting portions 32a-1 and 32a-2 are open in a window shape on a side surface of the side frame 32-1. In the bottom plates 32b-1 and 32b-2 of the fitting portions 32a-1 and 32a-2, guide grooves 32c-1 and 32c-2 for determining relative positions between the extension beams 23-1 and 23-2 and the side frame 32-1, and fixing pin fitting holes 32d-1 and 32d-2 for defining the relative positions between the extension beams 23-1 and 23-2 and the side frame 32-1 are provided. A side surface of each of the guide grooves 32c-1 and 32c-2 has a function of guiding a stopper pin 23-1f, and a deepest portion thereof has a function of restricting lateral and inward movements of the stopper pin 23-1f.

Moreover, as can be seen from FIG. 5C, in lower surfaces of the bottom plates 32b-1 and 32b-2, reinforcement ribs 32e-1 and 32e-2 are installed at center portions in the width direction along opening directions of the fitting portions 32a-1 and 32a-2. The fixing pin fitting holes 32d-1 and 32d-2 are provided on side portions of the reinforcement rib 32e-1 and 32e-2 so as to avoid the reinforcement rib 32e-1 and 32e-2.

The left side frame 32-2 is also provided symmetrically so as to have the same configuration as that of the right side frame 32-1 based on a center in a traveling direction of the car body 21. The left side frame 32-2 has configurations symmetrical to respective portions related to the right side frame 32-1, and thus, hereinafter, the right side frame 32-1 will basically be described.

Figure 6:
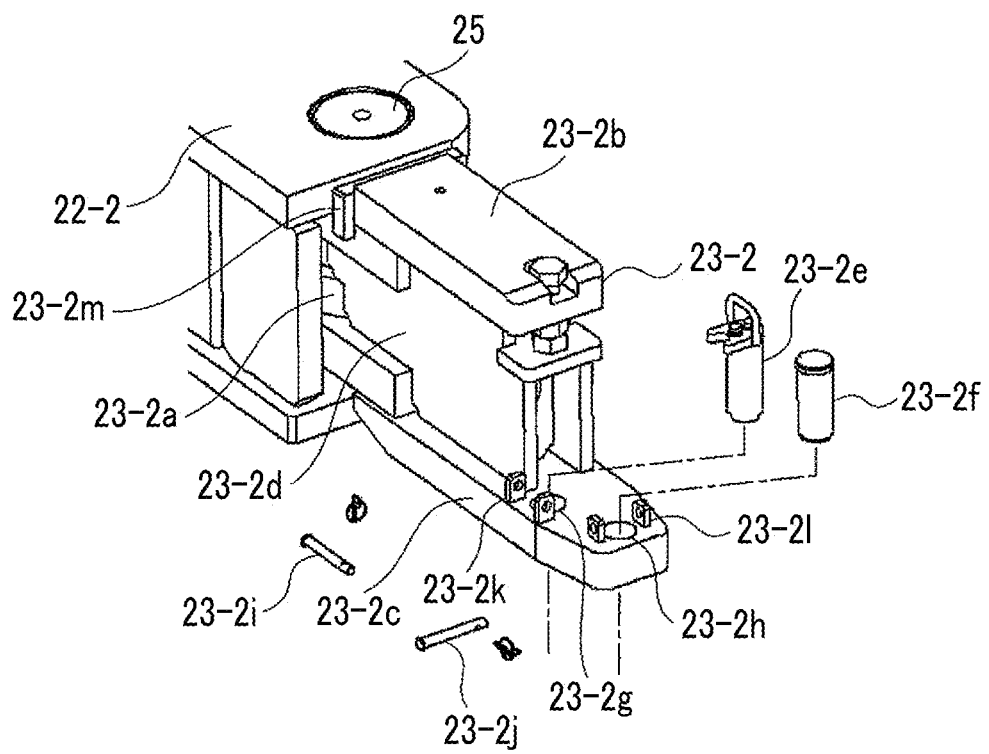
FIG. 6 is a main portion enlarged perspective view showing a right rear axle and a right rear extension beam in FIG. 3.

FIG. 6 is a main portion enlarged perspective view showing the right rear axle 22-2 and the right rear extension beam 23-2, and shows the vicinity of a distal end portion of the axle 22-2. As described above, the extension beams 23-1 and 23-2 are pivotally supported by the distal ends of the respective axles 22-1 and 22-2 by the connection pins 25 inserted in an up-down direction. FIG. 6 shows the right rear axle 22-2 and the right rear extension beam 23-2, and thus, the right rear axle 22-2 and the right rear extension beam 23-2 will be described in detail as an example.

The right rear extension beam 23-2 includes a pin insertion portion 23-2a, an upper plate 23-2b, a lower plate 23-2c, a vertical plate 23-2d, a fixing pin 23-2e and a stopper pin 23-2f. The pin insertion portion 23-2a is a portion into which the connection pin 25 is inserted and which is pivotally supported rotatably by a distal end of the axle 22-2. The upper plate 23-2b is a thickplate-shaped member which extends laterally from an upper portion of the pin insertion portion 23-2a. The lower plate 23-2c is a thick plate-shaped member which extends laterally from a lower portion of the pin insertion portion 23-2a. The vertical plate 23-2d is a member which connects the pin insertion portion 23-2a, the upper plate 23-2b, and the lower plate 23-2c to each other.

Figure 17:
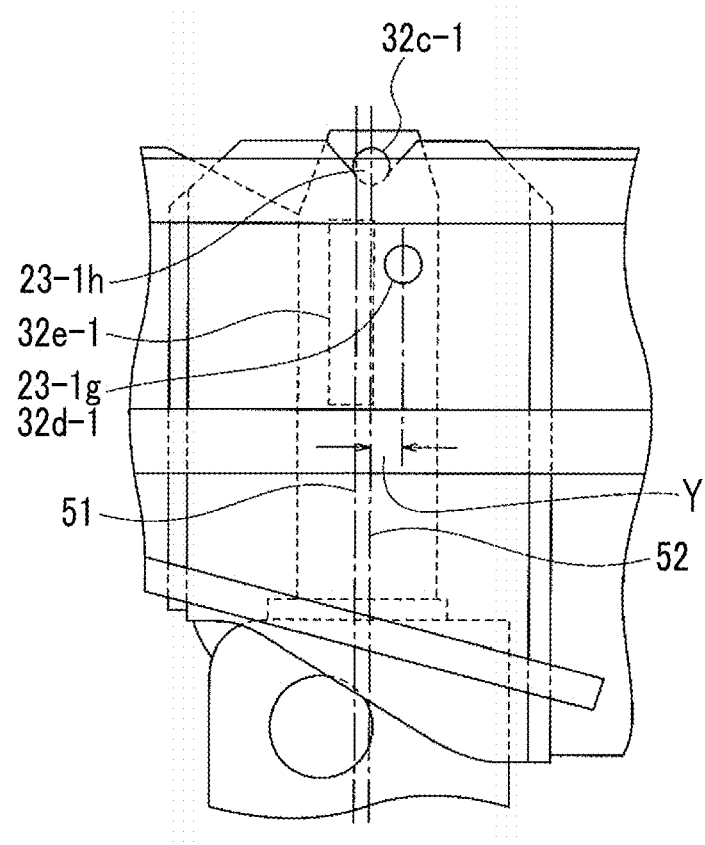
FIG. 17 is a view showing relationship between a fixing pin insertion hole, a stopper pin insertion hole, a guide groove, and a reinforcement rib at the time of extension in the embodiment of the present invention.

In addition, when the extension beam 23-2 is viewed from above, an end portion in the vicinity of the insertion portion of the connection pin 25 is referred to as a proximal end side, and an end portion in the vicinity of a portion where the fixing pin 23-2e and the stopper pin 23-2f are provided is referred to as a distal end side. In addition, a fixing pin insertion hole 23-2g into which the fixing pin 23-2e is inserted and a stopper pin insertion hole 23-2h into which the stopper pin 23-2f is inserted are provided on a distal end side of the lower plate 23-2c. Moreover, in the right front extension beam 23-1, as shown in FIG. 17 described later, a fixing pin insertion hole 23-1g is disposed to be offset at a position deviated by a predetermined distance γ from a center line (imaginary line) 52 drawn in a longitudinal direction of the extension beam 23-1 from a stopper pin insertion hole 23-1h located at a center in a width direction of the extension beam 23-1.

Figure 7:
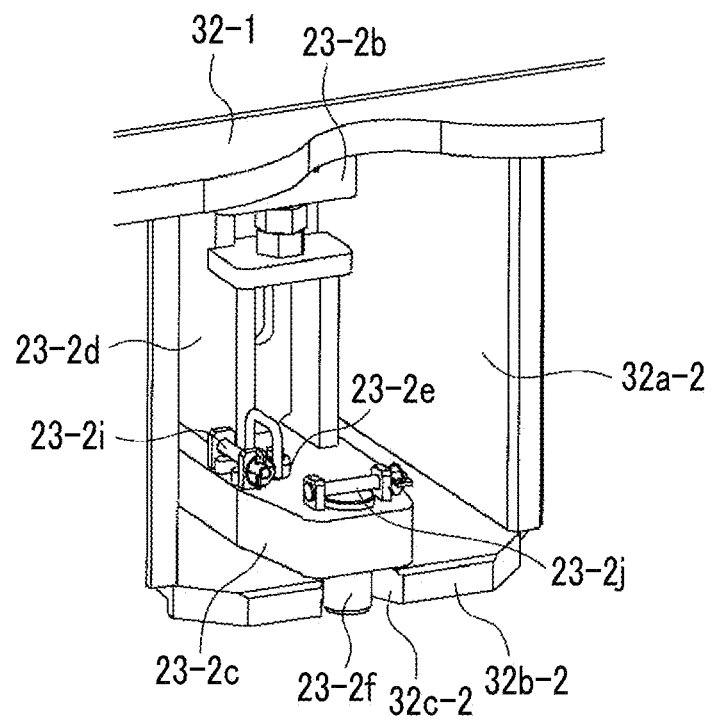
FIG. 7 is a main portion perspective view showing a state when the extension beam in FIG. 6 is fitted and fixed to a fitting portion.

FIG. 7 is a main portion perspective view showing a state when the extension beam 23-2 is fitted and fixed to the fitting portion 32a-2. As shown in FIG. 7, after the fixing pin 23-2e is inserted into the fixing pin insertion hole 23-2g, the fixing pin holding pin 23-2i is inserted into the fixing pin holding portion 23-2k. Moreover, after the stopper pin 23-2f is inserted into the stopper pin insertion hole 23-2h, a stopper pin holding pin 23-2j is inserted into a stopper pin holding portion 23-2l. Accordingly, the fixing pin 23-2e and the stopper pin 23-2f are prevented from coming off from a surface side of the lower plate 23-2c. Moreover, in FIG. 7, the stopper pin 23-2f is located in the guide groove 32c-2, and the extension beam 23-2 is positioned in the fitting portion 32a-2.

Figure 8:
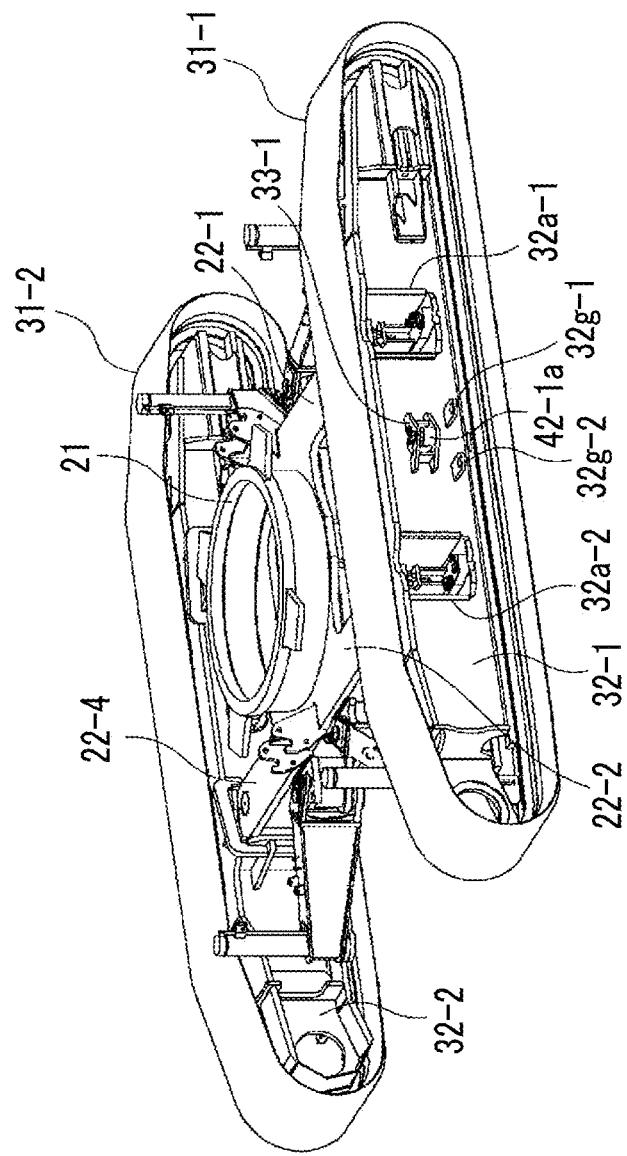
FIG. 8 is a perspective view showing a relationship between the car body and right and left crawlers when the extension beam in the embodiment of the present invention extends.
Figure 9:
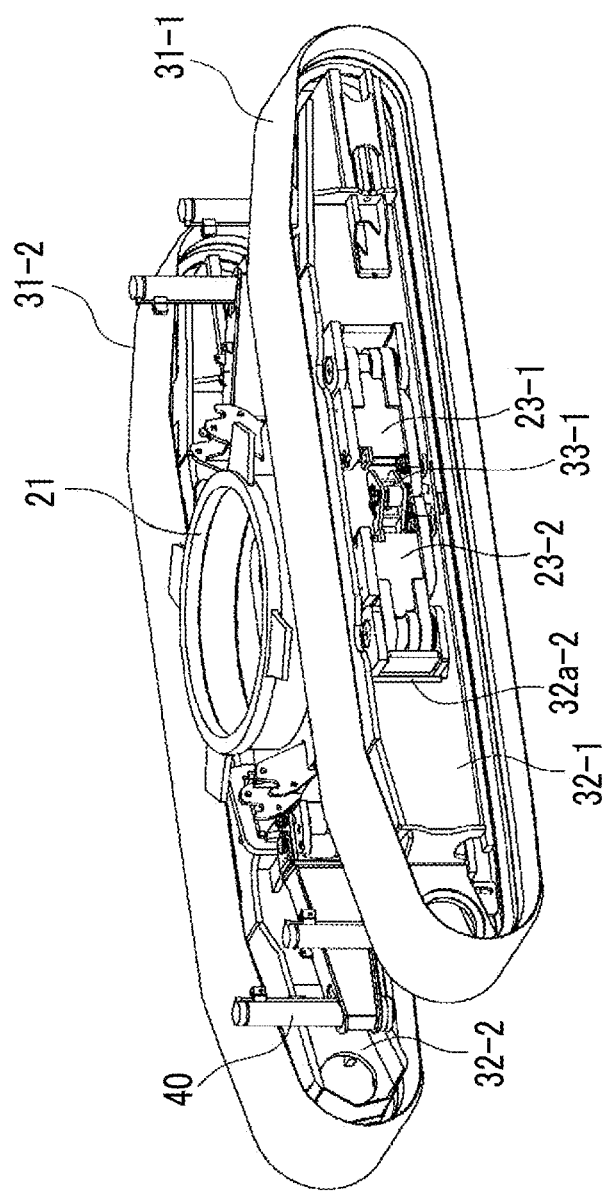
FIG. 9 is a perspective view showing a relationship between the car body and the right and left crawlers when the extension beam in the embodiment of the present invention is folded.
Figure 10:
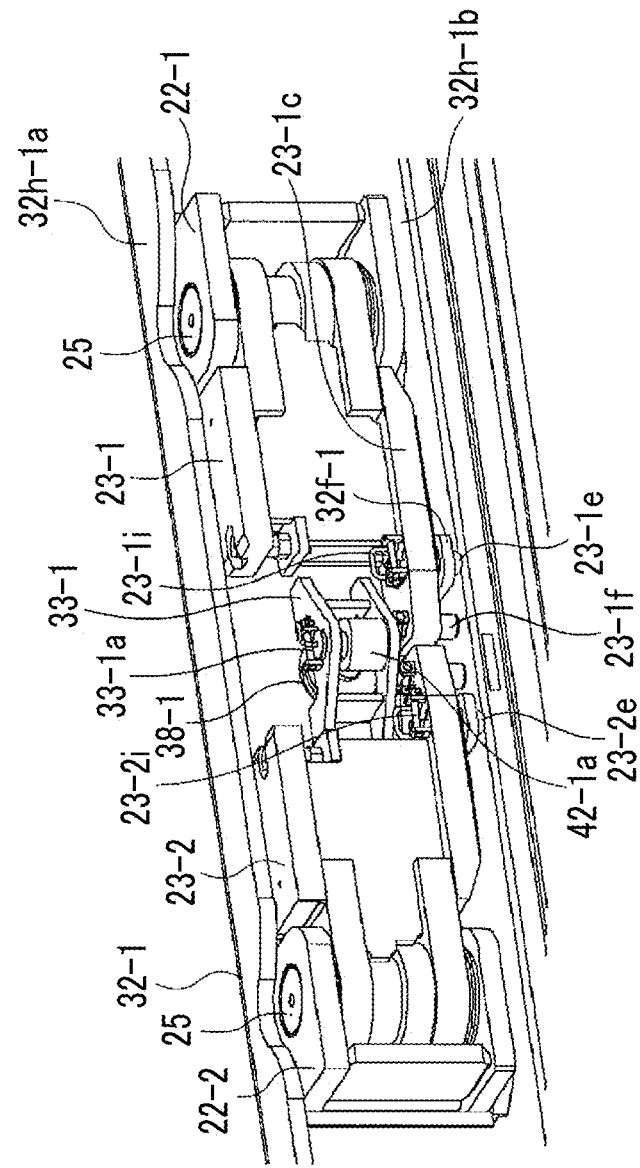
FIG. 10 is a main portion perspective view showing a fixed state of the extension beam when the extension beam is folded in FIG. 9.

The extension beams 23-1, 23-2, 23-3, and 23-4 are rotatably connected to the axles 22-1, 22-2, 22-3, and 22-4 via the connection pins 25 in order to extend the crawlers 31-1 and 31-2 to traveling positions or working positions thereof or contract the crawlers 31-1 and 31-2 at the time of transport. FIG. 8 is a perspective view showing relationships between the car body 21 and the right and left crawlers 31-1 and 31-2 when the extension beams 23-1, 23-2, 23-3, and 23-4 are extended (hereinafter, referred to as extend), and FIG. 9 is a perspective view showing the relationships between the car body 21 and the right and left crawlers 31-1 and 31-2 when the extension beams 23-1, 23-2, 23-3, and 23-4 are folded (hereinafter, referred to as retract). Further, FIG. 10 is a main portion perspective view showing fixed states of the extension beams 23-1 and 23-2 at the time of the retraction.

In order to fix the extension beam 23-2 in a state in which the extension beam 23-2 extends laterally, as shown in FIG. 6, the extension beam 23-2 rotates about the connection pin 25 such that the extension beam 23-2 extends laterally (in an extension direction of the axle 22-2) at the distal end of the axle 22-2. FIG. 6 shows a state where the extension beam 23-2 rotates by 90° in the clockwise direction from the time of the retraction. In addition, as shown in FIG. 10, the extension beam 23-2 can rotate between two positions of an extension position which is extended along the extension direction of the axis 22-2 and a retraction position folded so as to be orthogonal to the extension direction of the axis 22-2. Therefore, a degree θ of a rotation range between the above-described two positions of the extension beam 23-2 is approximately 90°.

Figure 11:
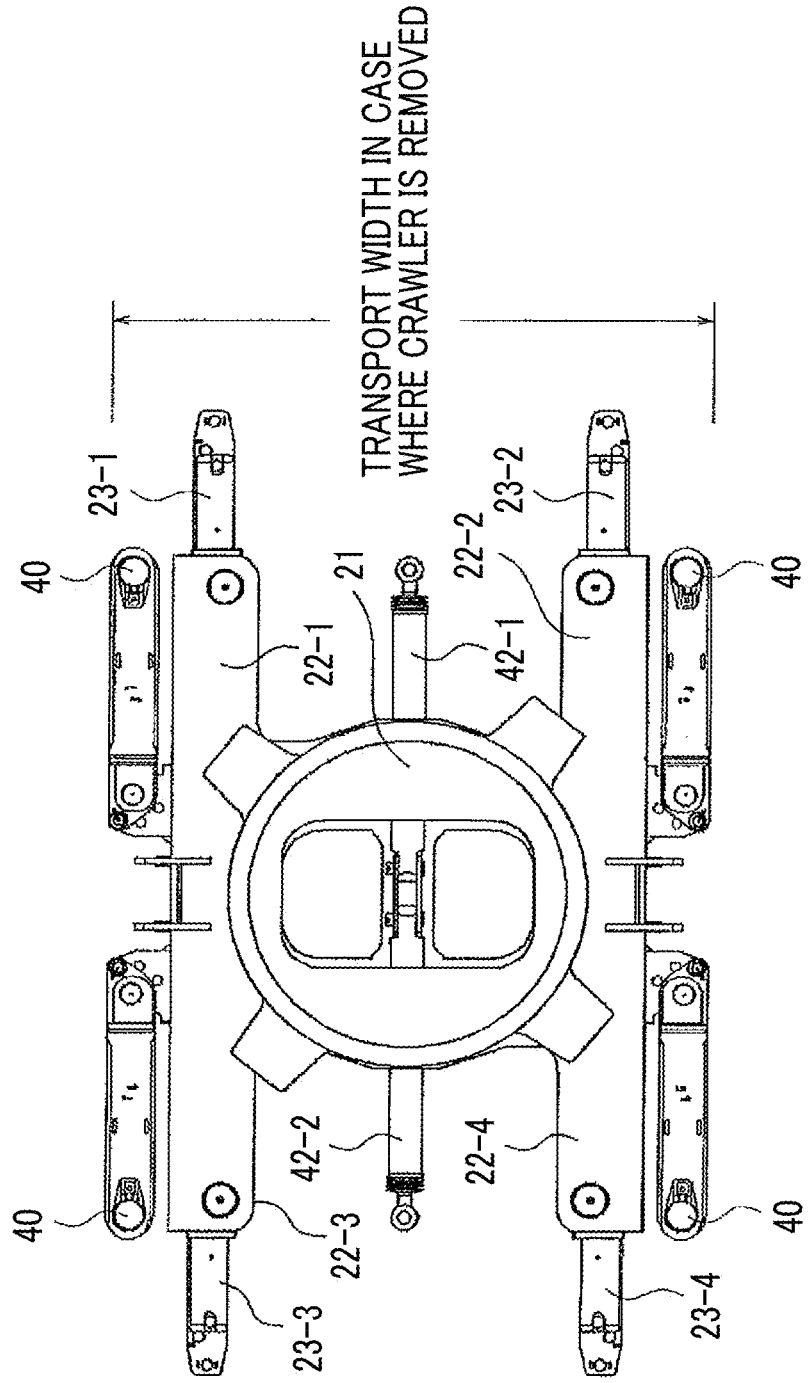
FIG. 11 is a plan view showing a state of a transport width in a case where the crawler is removed and the extension beam in FIG. 3 extends on an extension in a longitudinal direction of the axle.
Figure 12:
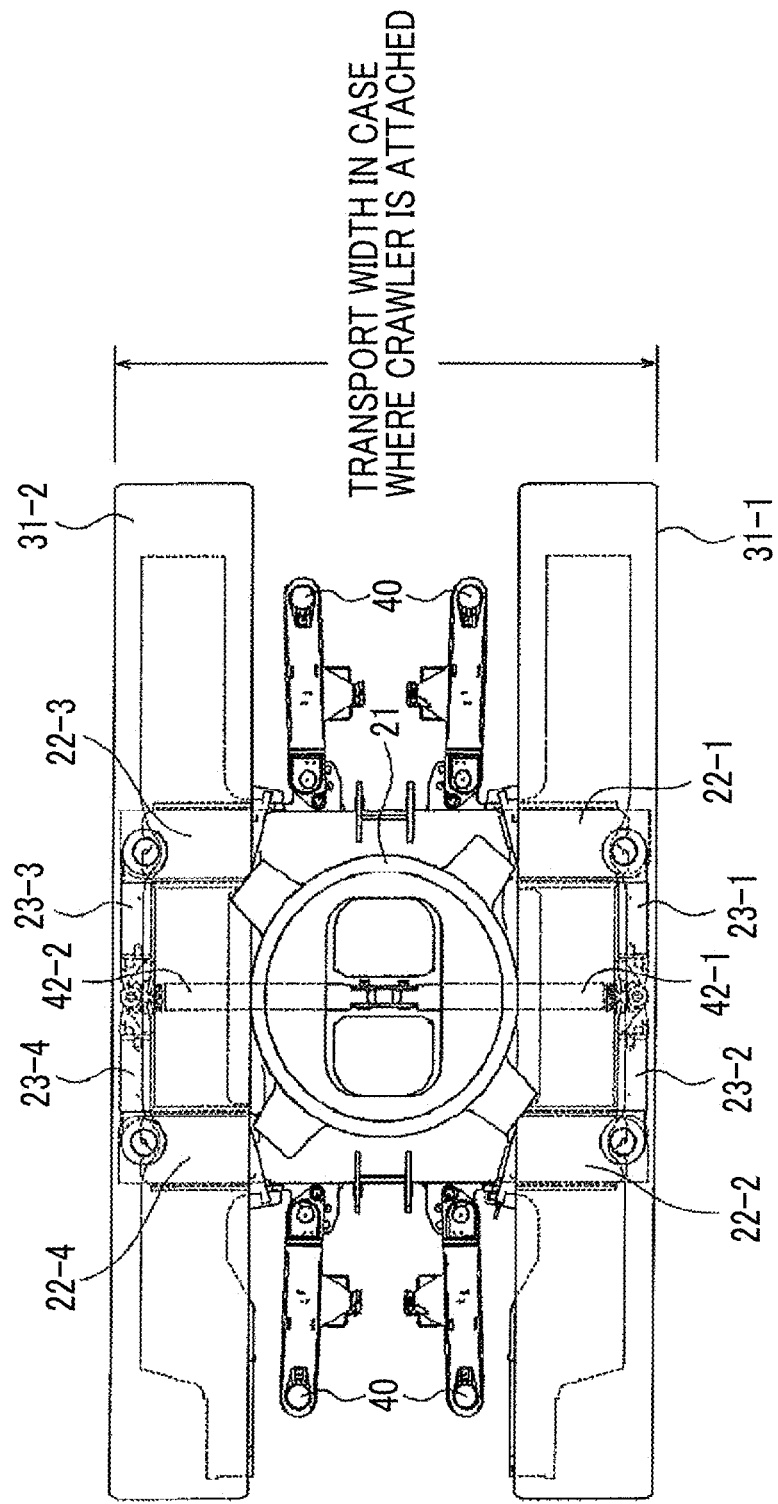
FIG. 12 is a plan view showing the state of the transport width in a case where the crawler is removed and the extension beam in FIG. 3 is folded in the longitudinal direction of the axle.

FIG. 11 shows a state where the extension beams 23-1, 23-2, 23-3 and 23-4 are extended on the extensions of the longitudinal directions of the axles 22-1, 22-2, 22-3, and 22-4, and FIG. 12 shows a state where the extension beams 23-1, 23-2, 23-3, and 23-4 are folded in the longitudinal directions of the axles 22-1, 22-2, 22-3, and 22-4. As can be seen from FIGS. 11 and 12, the extension beams 23-1 and 23-4 are folded in the clockwise direction, and the extension beams 23-2 and 23-3 are folded in the counterclockwise direction. In the case of the extension, an operation in the reverse direction is performed.

For example, as shown in FIG. 11, in a case where the crawlers 31-1 and 31-2 are attached to the axles 22-1, 22-2, 22-3, and 22-4 from a state where the crawlers 31-1 and 31-2 are removed, if the extension beams 23-1, 23-2, 23-3, and 23-4 are folded, the extension beams 23-1, 23-2, 23-3, and 23-4 extend and are fixed prior to the attachments of the crawlers 31-1 and 31-2. For this fixation, for example, an extension beam rotation stop plate 23-2m shown in FIG. 6 is used. In addition, as shown in FIG. 3, the lower traveling body 1 is jacked up using the jack-up devices 40, the crawler 31-1 is lifted by an auxiliary crane or the like, and the distal end sides of the extension beams 23-1 and 23-2 are laterally inserted into the fitting portions 32a-1 and 32a-2. In addition, when the stopper pin insertion hole 23-1h reaches the position of the guide groove 32c-1, the stopper pin 23-1f is inserted into the stopper pin insertion hole 23-1h. Thereafter, the crawler 31-1 is moved slightly outward, and the stopper pin 23-1f is located at the deepest portion of the guide groove 32c-1 and is positioned.

Next, the fixing pin 23-1e is inserted from the fixing pin insertion hole 23-1g into the fixing pin fitting hole 32d-1, and the extension beam 23-1 is fixed to the fitting portion 32a-1 of the side frame 32-1. This is simultaneously performed on the rear extension beam 23-2 of the right crawler 31-1, and the left crawler 31-2 is fixed to the extension beams 23-3 and 23-4. In this way, the crawlers 31-1 and 31-2 are attached to the car body 21.

If the crawlers 31-1 and 31-2 are in the retraction state shown in FIG. 9, the crawlers 31-1 and 31-2 are made to be in the extension state to enable a work. In this case, as shown in FIGS. 9 and 12, the crawlers 31-1 and 31-2 are already attached to the axles 22-1, 22-2, 22-3, and 22-4. In this case, the retraction cylinders 42-1 and 42-2 push the crawlers 31-1 and 31-2 laterally outward from the axles 22-1, 22-2, 22-3, and 22-4 toward the extension beams 23-1, 23-2, 23-3, and 23-4. In this case, the fixing pin 23-1e is removed from a lock hole 32g-1 of a lock plate 32f-1.

In this case, in the distal end portion of the stopper pin 23-1f, the guide groove 32c-1 of the fitting portion 32a-1 protrudes below the lower surface of the lower plate 23-1c of the extension beam 23-1. Therefore, if the crawlers 31-1 and 31-2 are laterally pushed outward by the retraction cylinders 42-1 and 42-2, the stopper pin 23-1f protruding downward from the lower surface of the lower plate 23-1c is guided to the guide groove 32c-1 provided in the bottom plate 32b-1 and is located at the deepest portion. In this state, horizontal positions of the fixing pin insertion hole 23-1g provided in the lower plate 23-1c and the fixing pin fitting hole 32d-1 provided in the bottom plate 32b-1 substantially coincide with each other.

In this state, when the fixing pin 23-1e is inserted into the fixing pin insertion hole 23-1g, the lower portion of the fixing pin 23-1e is inserted into the fixing pin fitting hole 32d-1. The same is applied to the rear extension beam 23-2. Accordingly, the crawler 31-1 is fixed to the extension beam 23-1 and 23-2. Moreover, as shown in FIG. 7, in the right rear extension beam 23-2, after the fixing pin 23-2e is inserted into the fixing pin insertion hole 23-2g and the fixing pin fitting hole 32d-2, coming out of the fixing pin 23-2e is prevented by the fixing pin holding pin 23-2i.

Meanwhile, in order to fold the extension beams 23-1, 23-2, 23-3 and 23-4 from the extension state shown in FIG. 8 to the retraction state shown in FIG. 9, a work procedure opposite to the above-described work procedure of the extension beams 23-1, 23-2, 23-3, and 23-4 from the retraction state to the extension state may be performed. That is, the fixing pin holding pins 23-1i and 23-2i are removed at the distal end portions of the folded extension beams 23-1 and 23-2 shown in FIG. 10, and the fixing pins 23-1e and 23-2e are removed from the fixing pin insertion holes 23-1g and 23-2g. Accordingly, the fixing between the axle 22-1 and the extension beams 23-1 and 23-2 is released. Moreover, similarly to the case where the crawlers 31-1 and 31-2 extend, in a case where the crawlers 31-1 and 31-2 are moved along the extension directions of the axles 22-1 and 22-2, the movements of the crawlers 31-1 and 32 can be performed in a state where the lower traveling body 1 is floated from the ground using the jack-up device 40.

The reason why positions of the crawlers 31-1 and 31-2 are shifted from the extension state shown in FIG. 8 to the retraction state shown in FIGS. 9 and 12 or to the removal states of the crawlers 31-1 and 31-2 shown in FIG. 11 when a work is performed is because this is required at the time of transport. For example, in Japan, it is desirable to remove the crawler to reduce a transport weight and to make a transport width 3,000 mm or less in order to obtain a traffic permission of a vehicle at the time of transport. Meanwhile, in a case of a country or a region where a vehicle traffic permission can be obtained at the time of transport with a crawler, it is desirable to make a width at the time of retraction as small as possible, for example, 3,500 mm or less. In addition, inmost cases, a size of the crawler crane 100 is defined by maximum lifting load×working radius. In this case, when the maximum lifting load×the working radius increases, the size of the crawler crane 100 also increases, and in order to transport this crawler crane 100, a restriction of the transport width becomes a problem.

In FIG. 11, for example, the crawlers 31-1 and 31-2 are removed from the axles 22-1, 22-2, 22-3, and 22-4, and the jack-up device 40 is rotated along the axes 22-1 and 22-3 and 22-2 and 22-4, and thus, a target value of a Japanese transport width is satisfied. Meanwhile, in FIG. 12, a target value of a transport width with a crawler is satisfied by only folding the extension beams 23-1, 23-2, 23-3, 23-4 and setting the crawlers 31-1 and 31-2 to the retraction state. According to differences in standards, the states of the transport is defined.

Meanwhile, a characteristic of the crawler crane 100 according to the present embodiment is that the fixing pin fitting holes 32d-1 and 32d-2 provided in the bottom plate 32b-1 and 32b-2 are formed outside the reinforcement ribs 32e-1 and 32e-2 so as to avoid the reinforcement ribs 32e-1 and 32e-2 as shown in FIGS. 5A to 5C. Hereinafter, a configuration before improvement is shown as a comparative example, and the configuration of the present embodiment will be described in comparison with the comparative example.

Figure 13:
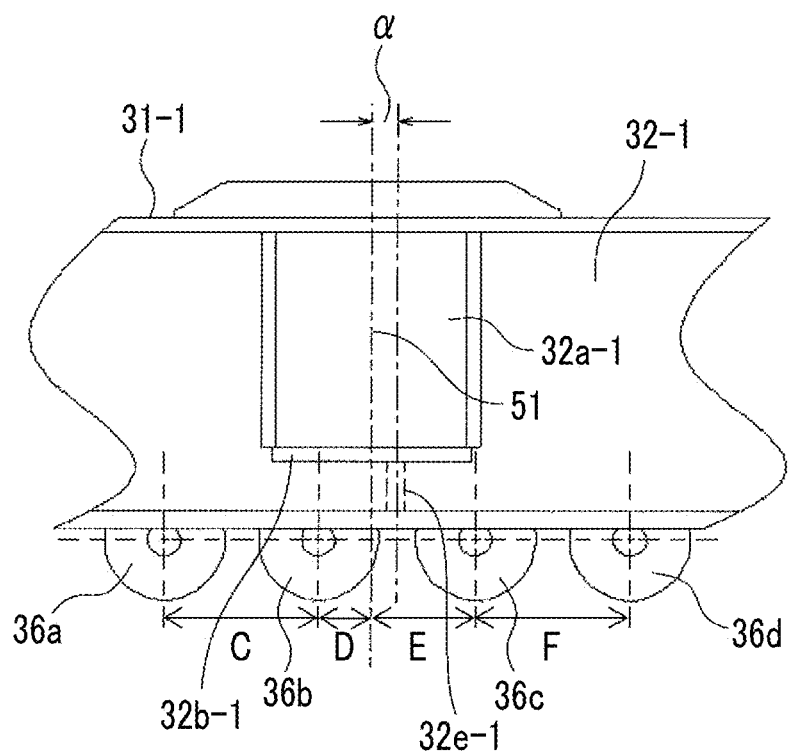
FIG. 13 is a front view showing a main portion of the crawler according to a comparative example.
Figure 14:
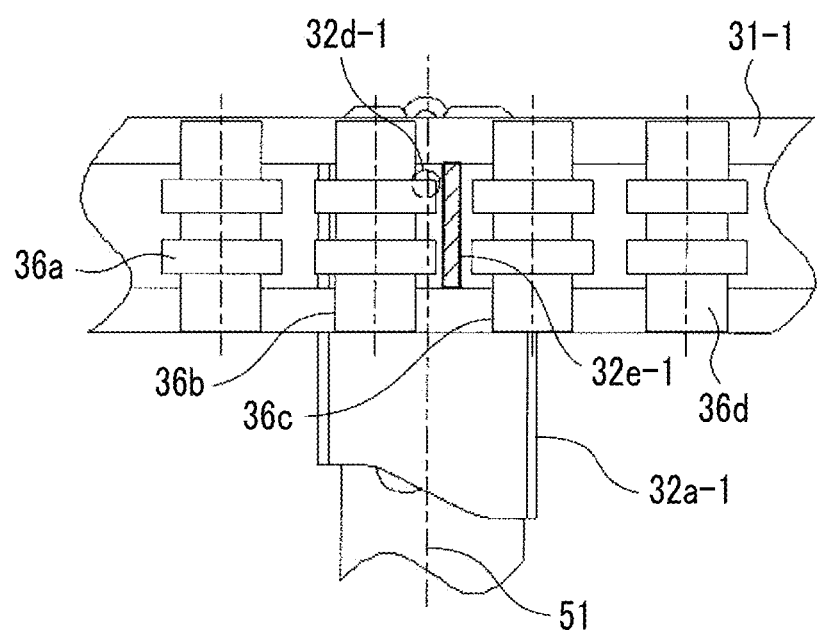
FIG. 14 is a bottom view of FIG. 13.

FIG. 13 is a front view showing a main portion of the crawler 31-1 according to the comparative example, and FIG. 14 is a bottom view of FIG. 13. In FIGS. 13 and 14, the reinforcement rib 32e-1 is provided on the lower surface of the bottom plate 32b-1 of the fitting portion 32a-1 formed on the side surface of the side frame 32-1 of the crawler 31-1. For example, the reinforcement rib 32e-1 has a thickness of approximately 60 mm, depending on lifting ability of a machine. A position of the reinforcement rib 32e-1 is a position separated by α from a load center 51 of a track beam assuming a load. In the drawings, the position of the reinforcement rib 32e-1 is a position separated by a distance α from a central portion (corresponding to the load center 51) in a front-rear direction of the crawler 31-1 of the fitting portion 32a-1. The reinforcement rib 32e-1 is provided so as to extend in the longitudinal direction of the fitting portion 32a-1 in parallel with the insertion direction of the extension beam 23-1 from the position separated by the distance α.

In the comparative example, since the fixing pin fitting hole 32d-1 is formed on the load center 51, the installation position of the reinforcement rib 32e-1 is set to a position avoiding the fixing pin fitting hole 32d-1. The fixing pin fitting hole 32d-1 is located on an imaginary center line extending in the longitudinal direction from the central portion of the guide groove 32c-1 of the extension beam 23-1. In this state, first to fourth lower rollers 36a, 36b, 36c and 36d are disposed at substantially equal distances from the reinforcement rib 32e-1. That is, installation distances of the second lower roller 36b and the third lower roller 36c are the same as each other based on the formation position (the position separated by the distance α from the load center 51) of the reinforcement rib 32e-1. In addition, the first lower roller 36a and the fourth lower roller 36d are disposed at positions where distances from the second lower roller 36b and the third lower roller 36c are the same as each other.

However, when the first to fourth lower rollers 36a, 36b, 36c, and 36d are disposed at the positions, a distance D from the load center 51 of the track beam to the second lower roller 36b and a distance E from the load center 51 of the track beam to third lower roller 36c are different from each other. Therefore, the second and third lower rollers 36b and 36c unevenly share the load of the track beam.

Figure 15:
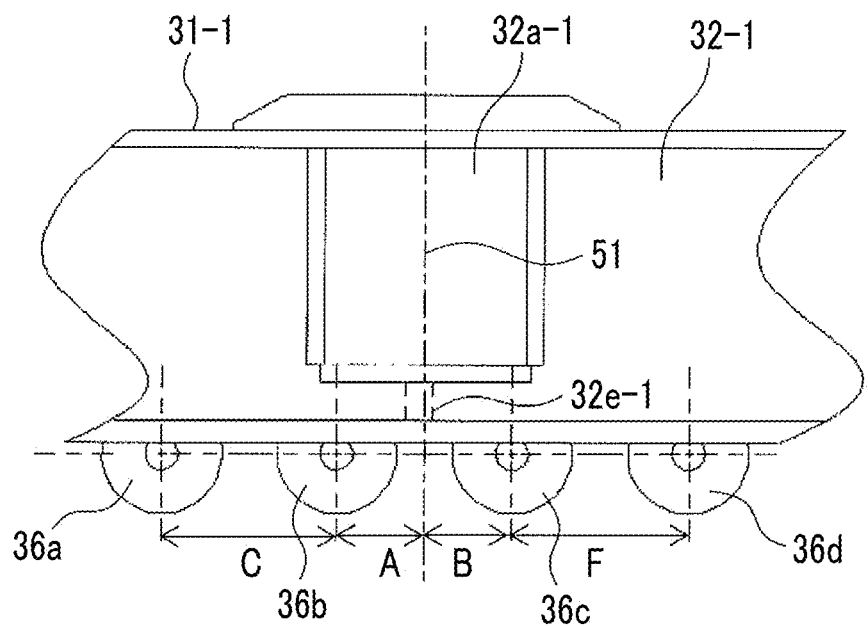
FIG. 15 is a front view showing a main portion of the crawler according to the embodiment of the present invention.
Figure 16:
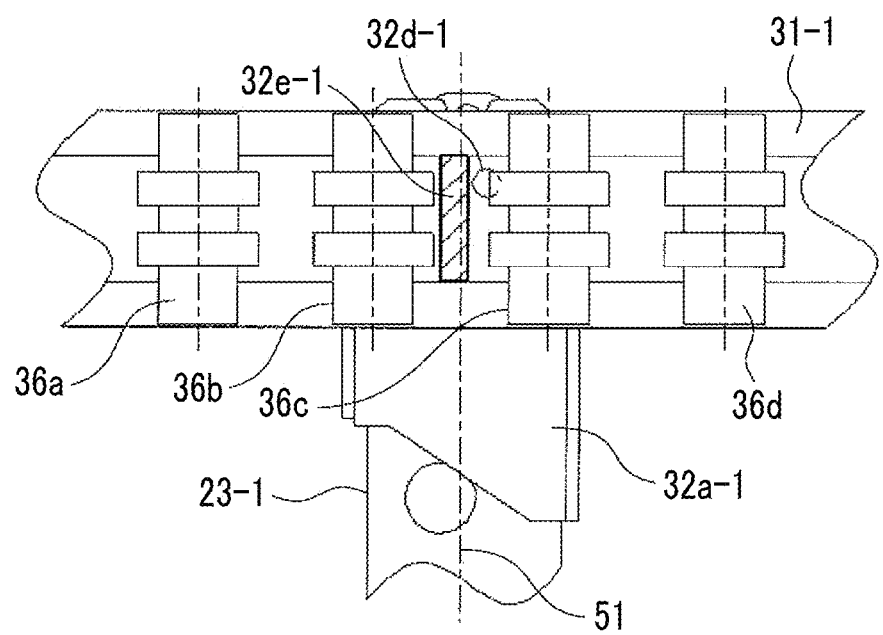
FIG. 16 is a bottom view of FIG. 15.

FIG. 15 is a front view showing a main portion of the crawler 31-1 according to the present embodiment, and FIG. 16 is a bottom view of FIG. 15. In the present embodiment, the reinforcement rib 32e-1 is formed on the lower surface of the bottom plate 32b-1 of the fitting portion 32a-1 of the load center 51 of the track beam, and the first to fourth lower rollers 36a, 36b, 36c, and 36d are disposed at substantially the same distance from the reinforcement rib 32e-1 similarly to the comparative example. According to this disposition, a distance A from the load center 51 of the track beam to the second lower roller 36b and a distance B from the load center 51 of the track beam to the third lower roller 36c are the same as each other. Therefore, the second and third lower rollers 36b and 36c share substantially the same load. As a result, compared to the comparative example, in the present embodiment, it is possible to reduce an uneven distribution of the load.

Further, in the comparative example, when the position of the reinforcement rib 32e-1 is set, it is necessary to take into consideration the positions of the fixing pin fitting hole 32d-1 and the third lower roller 36c, and thus, there is a design limitation. However, in the present embodiment, the position of the fixing pin fitting hole 32d-1 is offset to a position deviated from the load center 51 of the track, and thus, it is possible to avoid the design limitation in the comparative example.

FIG. 17 is a view showing a relationship between the fixing pin insertion hole 23-1g, the stopper pin insertion hole 23-1h, the guide groove 32c-1, and the reinforcement rib 32e-1 at the time of the extension, and corresponds to a view when the extension beam 23-1 and the fitting portion 32a-1 are viewed from sides of bottom surfaces thereof. As can be seen from FIG. 17, the reinforcement rib 32e-1 is provided on the load center 51 of the track beam, and the fixing pin insertion hole 23-1g and the fixing pin fitting hole 32d-1 are offset by the distance γ from the imaginary center line 52 of the extension beam 23-1.

Figure 18:
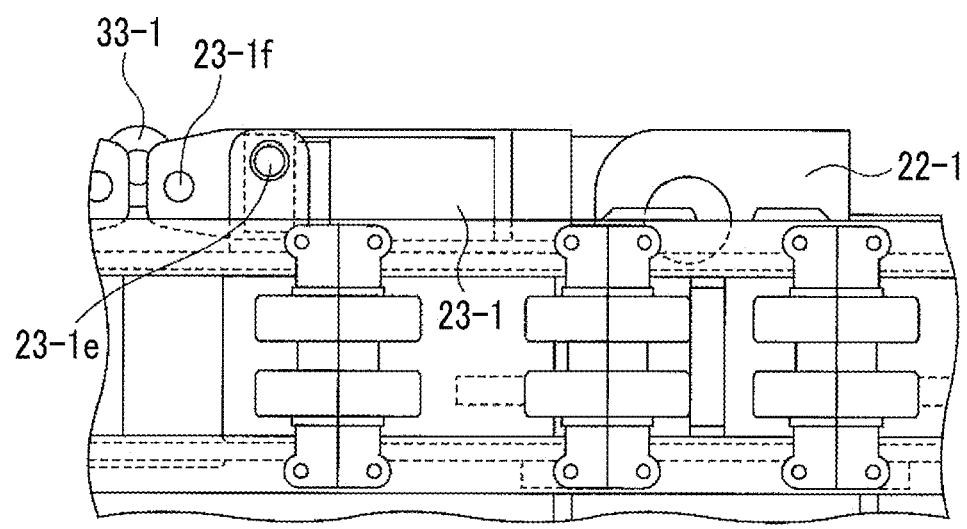
FIG. 18 is a main portion bottom view showing a fixed state of the extension beam by the fixing pin at the time of retraction in the embodiment of the present invention.
Figure 19:
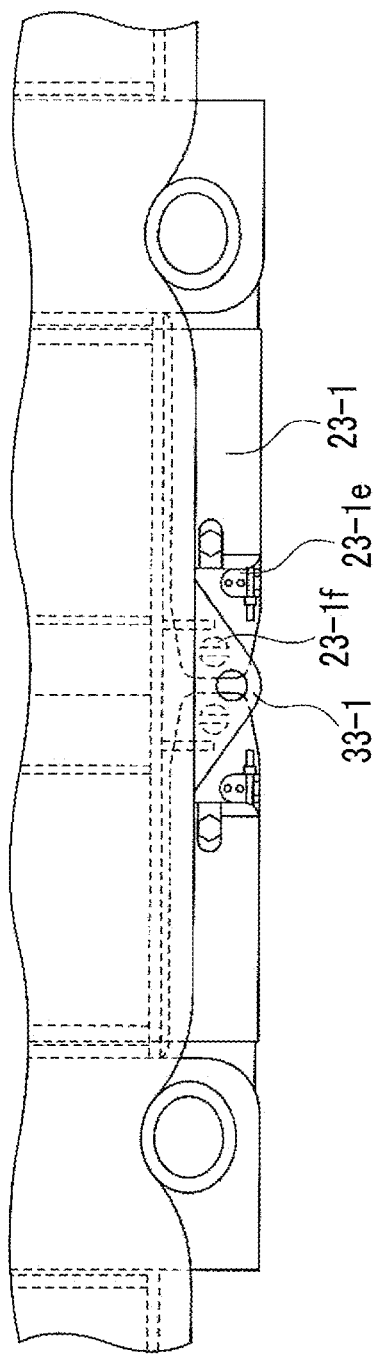
FIG. 19 is a main portion bottom view showing the fixed state of the extension beam by the fixing pin at the time of the retraction in the embodiment of the present invention.

FIG. 18 is a main portion bottom view showing the fixed state of the extension beam 23-1 by the fixing pin 23-1e at the time of the retraction, and FIG. 19 is a main portion plan view.

As also shown in FIG. 10, a retraction cylinder bracket 33-1 is formed by a pair of upper and lower triangular plates at a center of the side frame 32-1, and a protrusion hole 38-1 through which a distal end portion 42-1a of the retraction cylinder 42-1 protrudes from an outer surface is formed at a center portion of the upper and lower triangular plates of the side frame 32-1. The distal end portion 42-1a of the retraction cylinder 42-1 is formed in a cylindrical shape, and a coupling pin 33-1a is inserted into and fixed to the cylinder of the distal end portion 42-1a of the retraction cylinder 42-1 from a coupling pin insertion hole formed in the retraction cylinder bracket 33-1. Accordingly, the retraction cylinder 42-1 can be coupled to the side frame 32-1, and the above-described approaching and separating operation of the crawler 31-1 with respect to the car body 21 can be performed.

The extension beams 23-1 and 23-2 are folded between a frame upper plate 32h-1a on an upper side of the side frame 32-1 and a frame bottom plate 32h-1b on a lower side of the side frame 32-1. The fixing pin 23-1e is inserted into a lock hole 32g-1 formed in a lock plate 32f-1 of the frame bottom plate 32h-1b, and thus, the extension beam 23-1 is fixed to the side frame 32-1.

In this case, as shown in FIG. 17, the fixing pin insertion hole 23-1g is located at a position offset by the distance γ from the imaginary center line 52 of the extension beam 23-1, and thus, as shown in FIGS. 18 and 19, the fixing pin 23-1e can be mounted to the fixing pin insertion hole 23-1g or can be removed from the fixing pin insertion hole 23-1g without interfering with the retraction cylinder bracket 33-1. In addition, as described later, the position of the fixing pin insertion hole 23-1g is offset by the distance γ from the center line 52, and thus, it is possible to reduce a lateral force applied to the crawler 31.

Figure 20:
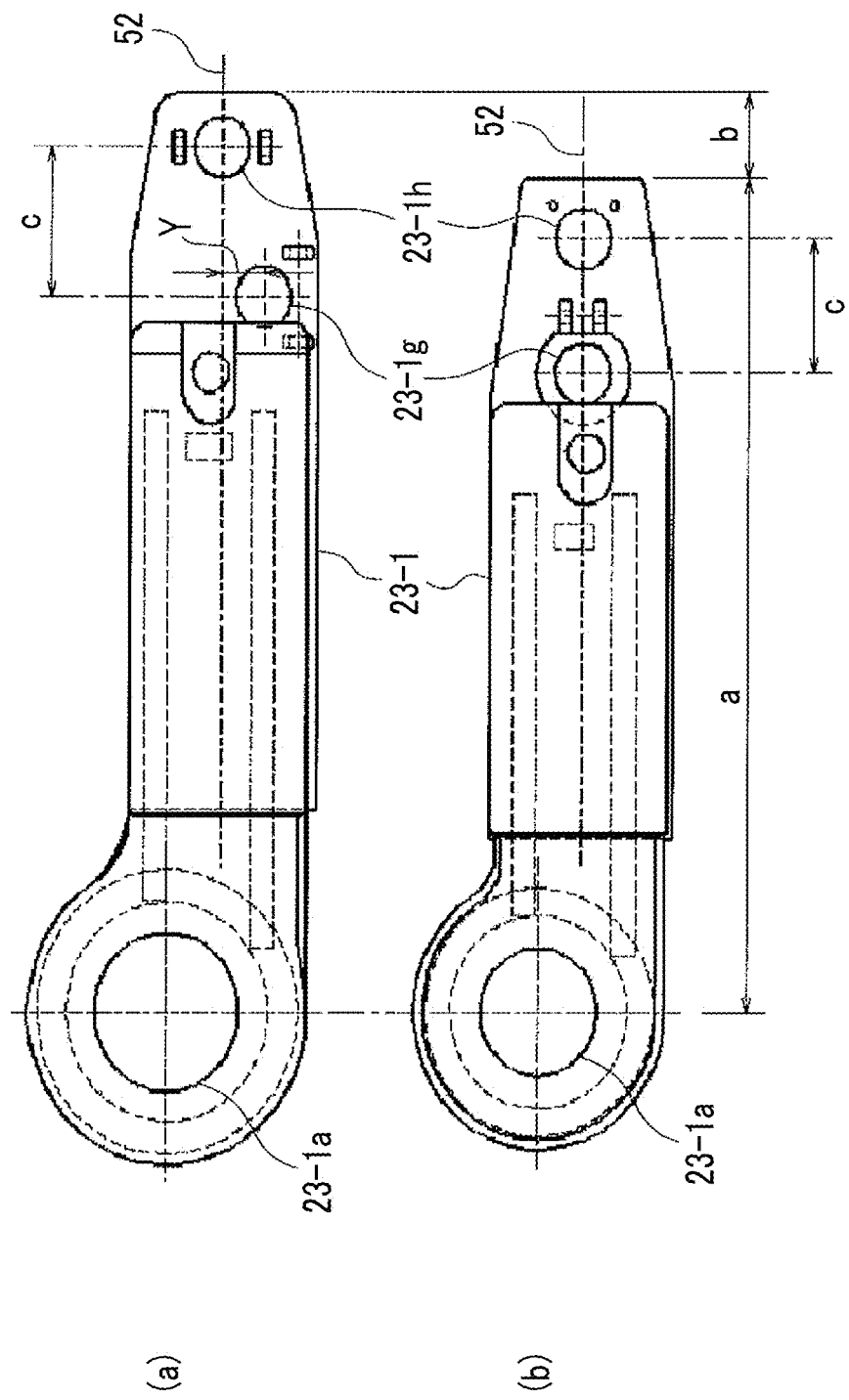
FIG. 20 is a plan view of the extension beam, (a) of FIG. 20 shows the extension of the present embodiment, and (b) of FIG. 20 shows an extension beam of a comparative example.

FIG. 20 is a plan view of the extension beam, (a) of FIG. 20 shows the extension of the present embodiment, and (b) of FIG. 20 shows an extension beam of a comparative example. In the extension beam 23-1 according to the present embodiment, the fixing pin insertion hole 23-1g is provided at a position offset by the distance γ from the center line 52 in the longitudinal direction of the extension beam 23-1, and in the comparative example, the fixing pin insertion hole 23-1g is provided on the center line 52 in the longitudinal direction of the extension beam 23-1. In each of the present embodiment and the comparative example, the stopper pin insertion hole 23-1h and the fixing pin insertion hole 23-1g are separated from each other by substantially a distance c. This distance c is set in consideration of workability when an operator mounts the fixing pin 23-1e or removes the fixing pin 23-1e from the outside of the crawler 31-1 at the time of the extension. That is, the position of the fixing pin insertion hole 23-1g is set to a position which avoids an interference between the retraction cylinder bracket 33-1 and the fixing pin 23-1e and does not impair the workability. At the time of the retraction, the extension beam 23-1 is folded, the fixing pin insertion hole 23-1g is located at a location having a short distance from the outside of the crawler 31-1, and thus, the workability does not pose a problem in the present embodiment and the comparative example.

In the comparative example, the fixing pin insertion hole 23-1g is located on the center line 52, and thus, compared to the present embodiment, the fixing pin insertion hole 23-1g is provided at a position close to the side of the pin insertion portion 23-1a in order to avoid the interference with a base of the retraction cylinder bracket 33-1. Meanwhile, in the present embodiment, the fixing pin insertion hole 23-1g is offset by the distance γ from the center line 52, and thus, the fixing pin insertion hole 23-1g is provided at a position closer to a distal end side from a proximal end side of the triangular plate of the retraction cylinder bracket 33-1. Therefore, the stopper pin insertion hole 23-1h can be provided at a position close to the distal end side by approximately the distance c from the position.

As a result, in the present embodiment, an offset length b close to the distal end side from the proximal end side of the triangular plate of the retraction cylinder bracket 33-1 can be added to a length a from the rotation center of the extension beam 23-1 in the comparative example. That is, the length a+b of the extension beam 23-1 in the present embodiment can be longer by the length b than the length a of the extension beam 23-1 in the comparative example. Accordingly, a longitudinal length of the extension beam 23-1 is increased, and thus, lateral lifting performance can be improved.

FIGS. 21A and 21B are explanatory views showing a relationship of forces applied to the crawler crane 100. FIG. 21A shows a state of a force added to the lower traveling body 1 of the crawler crane 100, and FIG. 21B shows a force in a machine lateral direction in the present embodiment in which the position of the fixing pin insertion hole 23-1g is offset by the distance γ from the center line 52.

As shown in FIG. 21A, traveling driving forces F1 and F2, resistances Fc1 and Fc2, and resistance moments Mc1 and Mc2 are applied to the right and left crawlers 31 mounted on the car body 21. The traveling driving forces F1 and F2 are provided by a traveling motor 39 driving the driving wheels 34 of the respective crawler 31, and the resistances Fc1 and Fc2 act in a direction impeding a forward movement by the rotation of the endless track 38. The resistance moments Mc1 and Mc2 are moments which are generated around the centers of the respective crawlers 31 by the traveling driving forces F1 and F2 and the resistances Fc1 and Fc2, as shown in FIGS. 21A and 21B. In addition, a symbol H is a width between the crawlers 31, and a symbol L is a distance between centers of the driving wheel 34 and the driven wheel 35.

As shown in FIG. 17, the fixing pin 23-1e is offset by the distance γ from the center line 52 of the extension beam 23, and a distance between the fixing pins 23-1e with respect to the crawler 31 is I.

The resistance moment which is generated in the left crawler 31 corresponding to a left side in FIGS. 21A and 21B during the traveling is Mc1. Moreover, a force P1 in the machine lateral direction acting on the fixing pin 23-1e by the resistance moment Mc1 is Mc1/I.

That is, $$Mc1 = P1 \times (I/2) + P1 \times (I/2) = P1 \times I$$

In addition, the force P1 in the machine lateral direction is $$P1 = Mc1/I \quad (1)$$

In the comparative example, since the distance between the fixing pins 23-1e corresponds to the distance between the center lines 52, the distance between the fixing pins 23-1e in the present embodiment is longer than the distance between the fixing pins 23-1e in the comparative example, and thus, from Expression (1), a lateral force in the present embodiment is reduced. That is, the distance I between the fixing pins 23-1e in the present embodiment increases, and thus, the force P1 in the machine lateral direction can be reduced as compared with the comparative example. As a result, a size of the pin can be reduced, a cost thereof can be reduced, and a layout can be facilitated.

Figure 22:
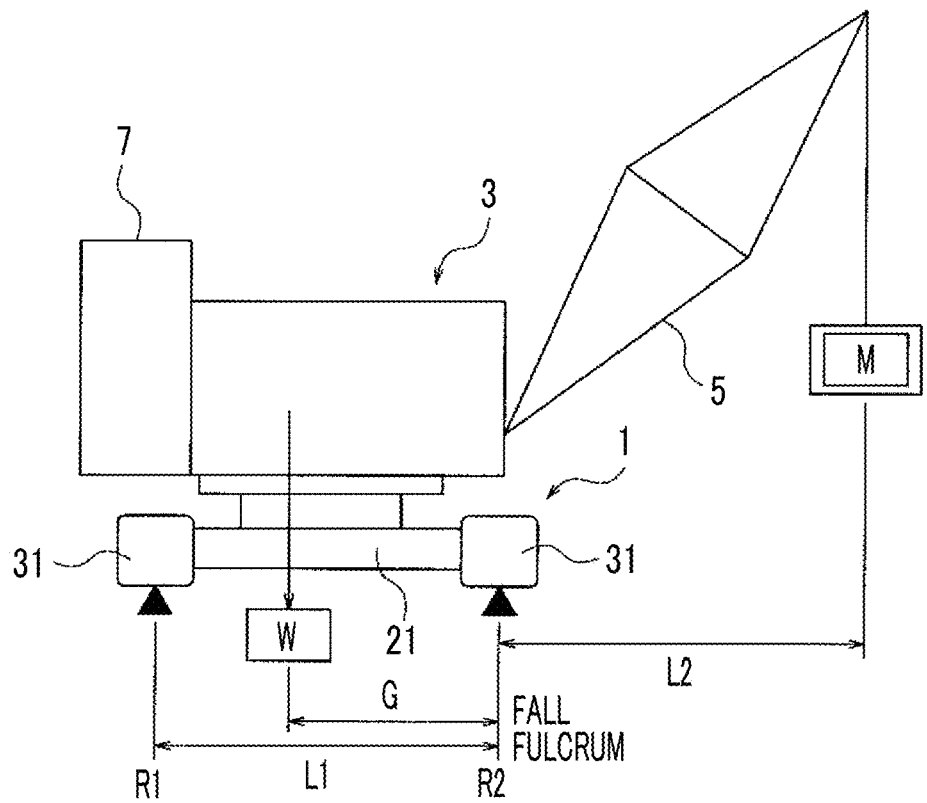
FIG. 22 is an explanatory view showing a principle of improving lateral lifting performance by lengthening the extension beam in the embodiment of the present invention.

FIG. 22 is an explanatory view showing a principle of improving lateral lifting performance by lengthening the extension beam 23.

In FIG. 22, when center positions of the left and right crawlers 31 are respectively indicated by R1 and R2, a distance between the center positions R1 and R2 of the left and right crawlers 31 is indicated by L1, a load at a position of the center of gravity of the entire crawler crane 100 is indicated by W, a horizontal distance between the position of the center of gravity and the center position R2 of the right crawler 31 is indicated by G, amass of a suspension load is indicated by M, and a horizontal distance between the center position R2 of the right crawler 31 and the mass of the suspension load is L2 is indicated by L2, a lateral stability is calculated so that the crawler crane 100 does not fall. The stability is generally indicated by a value of a ratio where a stability moment is a numerator and the overturning moment is a denominator. In addition, the center position R2 corresponds to a fall fulcrum which is a fulcrum in a case where the crawler crane 100 falls.

As the value of the stability increases, the stability is improved. For example, in a safety rule of a crane or like, it is necessary to pass a stability test in which a load M equivalent to 1.27 times a rated load is suspended.

The stability is expressed by stability=stability moment/overturning moment.

If the Expression is replaced by the symbols shown in FIG. 22, stability=W×G/M×L2

In this case, as shown in FIG. 20, in the present embodiment, the horizontal distance G is longer by a length b than that in the comparative example shown as the related art, and it is possible to widen a lower gauge width indicated by a distance L1. Accordingly, in the present embodiment, the fall fulcrum R2 moves outward from that of the comparative example, which can contribute to an improvement of the stability.

More specifically, the extension beam 23 is provided to secure restriction of a dimension in a width direction (transport width restriction) during transport of a working machine such as the crawler crane 100 and the stability against the fall of the crawler crane 100 which is the working machine, for example. The stability is determined by the stability moment acting on a side of a machine body from the fall fulcrum which is a function of a distance from a position of the center of gravity of the entire machine body to the fall fulcrum. As described above, the stability is expressed by the ratio having the overturning moment acting on the suspension load side from the fall fulcrum as a denominator, and as this value increases, the stability is improved. Moreover, in addition to the above-described lateral stability, it is necessary to consider a forward stability as the stability. However, the present embodiment relates to the improvement of the lateral stability based on the increase of the gauge width, and thus, the forward stability is omitted.

The working machines with the crawler require a larger gauge width (FIG. 4) to secure an ability to hang a large load and a good stability. Meanwhile, a longer extension beam is required in order to achieve the transport width as narrow as possible (FIGS. 11 and 12), large suspension performance, and a good stability (FIG. 20).

Accordingly, in recent years, in order to increase the stability after securing the transport width restriction, it is required to extend the extension length of the extension beam. In this case, sizes and configurations the car body and the crawler side frame are limited depending on the ability of the working machine, and thus, it is necessary to extend the length of the extension beam within the limitation.

In the present embodiment, as described with reference to FIG. 20, in the working machine with the crawler having the same standard, the working machine with the crawler can be set to be longer by the length b than that of the related art, and thus, the stability can increase accordingly.

For example, the related art discloses that an extension beam extends (rotates and extends), a stopper pin is mounted on a distal end side of a lower plate, and a fixing pin is mounted on a slightly proximal end side from the mounted position of the stopper pin. Further, as disclosed in the related art, the lower plate of the extension beam is folded toward a crawler side frame, and the fixing pin is attached to an insertion hole of an extension beam fixing bracket protruding from a side surface of the crawler side frame such that the extension beam is fixed.

Meanwhile, as can be seen from the related art, a distal end of a retraction cylinder is inserted from an inner side of the side frame to an outer side thereof and is pin-coupled to a retraction cylinder bracket protruding from an outer side surface of the side frame. In this state, a distal end of the extension beam is retracted to a position to avoid an interference with the retraction cylinder bracket as disclosed in the related art. In addition, the fixing pin also secures a predetermined space between the upper plate of the extension beam and the fixing pin in order for the operator to attach and detach the fixing pin, and the fixing pin is mounted on a through-hole at a position which is positioned on a center line of a longitudinal direction of the extension beam and is closer to the proximal end side of the extension beam than the guide pin. This is because, as described above, workability of an attachment operation at the time of the extension of the extension beam is taken into consideration.

Meanwhile, in the embodiment of the present application, it is possible to secure the distance c which does not degrade the workability even if the extension beam 23 is lengthened, and thus, the stability can be reliably improved.

According to the present embodiment configured as described above, the following effects can be obtained.

In the present embodiment, the crawler crane 100 (the working machine with a crawler) includes the lower traveling body 1 which includes the crawler 31 and the car body 21, the upper turning body 3 which is turnably supported by the car body 21, the extension beam 23 which is installed rotatably on the distal end side of the axle 22 of the car body 21 to be parallel in the longitudinal direction of the crawler 31, the fitting portion 32a which is open in the side frame 32 of the crawler 31, the fixing pin 23-1e which fixes the extension beam 23 inserted into the fitting portion 32a to the side frame 32, the fixing pin insertion hole 23-1g which is perforated in the extension beam 23 and into which the fixing pin 23-1e is inserted, the fixing pin fitting hole 32d-1 which is perforated in the fitting portion 32a and into which the fixing pin 23-1e is inserted, and the reinforcement rib 32e which extends in the direction perpendicular to the side surface of the side frame 32 on the lower surface of the bottom plate 32b of the fitting portion 32a, in which the extension beam 23 extends such that the extension beam 23 is inserted into the fitting portion 32a, the fixing pin 23-1e is inserted into the fixing pin fitting hole 32d via the fixing pin insertion hole 23-1g, and thus, the extension beam 23 is fixed to the fitting portion 32a, the reinforcement rib 32e is provided at the center portion of the opening of the fitting portion 32a, and the fixing pin fitting hole 32d is disposed at the position which does not interfere with the reinforcement rib 32e.

In this configuration, the reinforcement rib 32e is present along the longitudinal direction of the fitting portion 32a from the center portion of the opening of the fitting portion 32a opened to the side surface of the side frame 32-1, and thus, loads shared by the lower rollers 36a, 36b, 36c and 36d of the lower traveling body 1 located below the reinforcement rib 32e are equalized. Frequencies of failures of the lower rollers 36b and 36c closest to the reinforcement rib 32e are reduced, and degrees of wear of the lower rollers 36b and 36c are equal to those of the other lower rollers 36a and 36d. As a result, lifetimes of the lower rollers 36a, 36b, 36c, and 36d can be averaged, and a frequency of maintenance can be reduced.

Further, in the present embodiment, two pairs of the axles 22-1, 22-2, 22-3, and 22-4 are provided in the car body 21, a pair of the fitting portions 32a-1 and 32a-2 is open in the side frame 32-1, the fixing pin insertion holes 23-1g are respectively provided at positions (distance γ) which are deviated toward the outer sides of the extension beams 23-1 and 23-2 so as to be paired when the crawler 31 is attached from the imaginary center line 52 in the longitudinal direction of the extension beam 23 passing through the center of the extension beam 23 in the width direction, and the fixing pin fitting hole 32d is provided at the position corresponding to the fixing pin insertion hole 23-1g. Accordingly, when the extension beam 23 is assembled to the crawler 31, it is possible to avoid an interference with other members located on the center line 52, for example, the retraction cylinder bracket (extendable member coupling bracket) 33-1.

Further, in the present embodiment, the crawler crane 100 further includes the retraction cylinder (extendable member) 42 which moves the crawler 31 close to or away from the car body 21, and the retraction cylinder bracket (extendable member coupling bracket) 33-1 which couples the distal end of the retraction cylinder 42 to the side surface of the side frame 32 on the side to which the extension beam 23 protrudes from the fitting portion 32a, and when the protrusion portion of the extension beam 23 which is inserted into the fitting portion 32a and protrudes from the side frame 32 is folded, the fixing pin insertion hole 23-1g is located outside the retraction cylinder bracket 33-1. Accordingly, not only the interference between the fixing pin 23-1e and the retraction cylinder bracket 33-1 can be avoided, but also the workability at the time of mounting the fixing pin 23-1e in the fitting portion 32a may be not impaired even in a case where the extension beam 23 is lengthened. Therefore, it is possible to lengthen the extension beam 23, and the lateral suspension performance can be improved. In addition, compared to the related art, the distance I between the fixing pin fitting holes 32d-1 and 32d-2 of the extension beams 23-1 and 23-2 paired when the crawler 31 is attached is widened, and thus, it is possible to reduce the size of the pin and reduce the cost, and the layout can be facilitated.

Moreover, in the present embodiment, the crawler crane 100 further includes the lock hole 32g-1 into which the fixing pin 23-1e is inserted via the fixing pin insertion hole 23-1g when the extension beam 23 is folded outside the side frame 32 and which fixes the extension beam 23 on the side surface side of the side frame 32. As a result, the extension beam 23 can be reliably held on the side surface of the side frame 32 even during the retraction. In addition, even if the formation position of the fixing pin fitting hole 32d is changed to the position deviated from the center line 52 as in the present embodiment, the transport width is the same as that of the related art, and thus, transportability is not impaired.

It should be understood that the invention is not limited to the above-described embodiment, but may be modified into various forms on the basis of the spirit of the invention. Additionally, the modifications are included in the scope of the invention.

What is claimed is:

1. A working machine with a crawler, comprising:
  a lower traveling body which includes a pair of crawlers and a car body;
  an upper turning body which is turnably supported by the car body;
  an extension beam which is installed rotatably on a distal end side of an axle of the car body to be parallel in a longitudinal direction of the crawler;
  a fitting portion which is open in a side frame of the crawler;

a fixing pin which fixes the extension beam inserted into the fitting portion to the side frame;

a fixing pin insertion hole which is perforated in the extension beam and into which the fixing pin is inserted;

a fixing pin fitting hole which is perforated in the fitting portion and into which the fixing pin is inserted; and a reinforcement rib which extends in a direction perpendicular to a side surface of the side frame on a lower surface of a bottom plate of the fitting portion, wherein the extension beam extends such that the extension beam is inserted into the fitting portion, the fixing pin is inserted into the fixing pin fitting hole via the fixing pin insertion hole, and thus, the extension beam is fixed to the fitting portion, wherein the reinforcement rib is provided at a center portion of an opening of the fitting portion, and wherein the fixing pin fitting hole is disposed at a position which is deviated from an imaginary center line extending along a longitudinal direction of the fitting portion from the center portion and does not interfere with the reinforcement rib.

2. The working machine with a crawler according to claim 1, wherein two pairs of the axles are provided in the car body, wherein a pair of the fitting portions is open in the side frame, wherein the fixing pin insertion holes are respectively provided at positions which are deviated toward an outer side of the extension beam so as to be paired from the imaginary center line in a longitudinal direction of the extension beam passing through a center of the extension beam in a width direction, and wherein the fixing pin fitting hole is provided at a position corresponding to the fixing pin insertion hole.

3. The working machine with a crawler according to claim 2, further comprising:

an extendable member which moves the crawler close to or away from the car body; and an extendable member coupling bracket which couples a distal end of the extendable member to the side surface of the side frame on a side to which the extension beam protrudes from the fitting portion, wherein when a protrusion portion of the extension beam which is inserted into the fitting portion and protrudes from the side frame is folded, the fixing pin insertion hole is located outside the extendable member coupling bracket.

4. The working machine with a crawler according to claim 3, further comprising:

a lock hole into which the fixing pin is inserted via the fixing pin insertion hole when the protrusion portion is folded and which fixes the extension beam on a side surface side of the side frame.

* * * * *